United States Patent [19]
Hoogland

[11] Patent Number: 6,024,047
[45] Date of Patent: Feb. 15, 2000

[54] BIRD FEEDER

[75] Inventor: Frank Michael Hoogland, Holland, Mich.

[73] Assignee: Seed Resources L.L.C., Grand Rapids, Mich.

[21] Appl. No.: 09/108,957

[22] Filed: Jun. 30, 1998

Related U.S. Application Data

[60] Provisional application No. 60/056,168, Aug. 19, 1997, and provisional application No. 60/066,385, Nov. 21, 1997.

[51] Int. Cl.⁷ ................................................ A01K 39/00
[52] U.S. Cl. ...................... 119/51.03; 119/57.8; 119/467; 119/481
[58] Field of Search .................... 119/52.2, 52.3, 119/57.8, 57.9, 428, 429, 431, 468, 481, 51.03, 459, 461, 477, 464, 475, 467

[56] References Cited

U.S. PATENT DOCUMENTS

| | | | |
|---|---|---|---|
| D. 85,404 | 10/1931 | Townley | D30/124 |
| D. 330,953 | 11/1992 | Schneider | D30/124 |
| D. 351,691 | 10/1994 | Lipton | D30/127 |
| D. 360,496 | 7/1995 | Norman | D30/124 |
| D. 376,877 | 12/1996 | Hardison | D30/124 |
| 1,092,314 | 4/1914 | White | 119/51.03 |
| 2,504,282 | 4/1950 | Tobias | 119/51.03 |
| 3,083,687 | 4/1963 | Slaven | 119/52.2 |
| 3,273,537 | 9/1966 | Orr | 119/51.03 |
| 3,398,719 | 8/1968 | Walker | 119/468 |
| 4,173,200 | 11/1979 | Olsen et al. | 119/428 |
| 4,223,637 | 9/1980 | Keefe | 119/52.2 |
| 4,570,574 | 2/1986 | Burkholder | 119/481 |
| 4,607,597 | 8/1986 | Sevigny | 119/51 |
| 5,076,214 | 12/1991 | Petit | 119/51.03 |
| 5,195,460 | 3/1993 | Loken | 119/57.9 |
| 5,533,467 | 7/1996 | Lancia | 119/57.9 |
| 5,699,752 | 12/1997 | Wilkins | 119/51.03 |
| 5,758,596 | 6/1998 | Loiselle | 119/52.2 |
| 5,826,539 | 10/1998 | Bloedorn | 119/52.2 |
| 5,826,541 | 10/1998 | Wilkins | 119/57.8 |

FOREIGN PATENT DOCUMENTS 157822  2/1957  Sweden ................................. 119/428

*Primary Examiner*—Michael J. Carone
*Assistant Examiner*—James S. Bergin
*Attorney, Agent, or Firm*—Miller, Johnson, Snell & Cummiskey, P.L.C.

[57] ABSTRACT

A bird feeder for retaining compressed suet-seed cakes is provided having a construction permitting easier refill of the feeder as well as making it more difficult for squirrels and other animals from raiding the feeder. Two embodiments of the feeder are disclosed including a hinged side door which is kept closed under tension equal to the weight of the suspended feeder and one having foldable perches which conserves packing material and space.

23 Claims, 3 Drawing Sheets

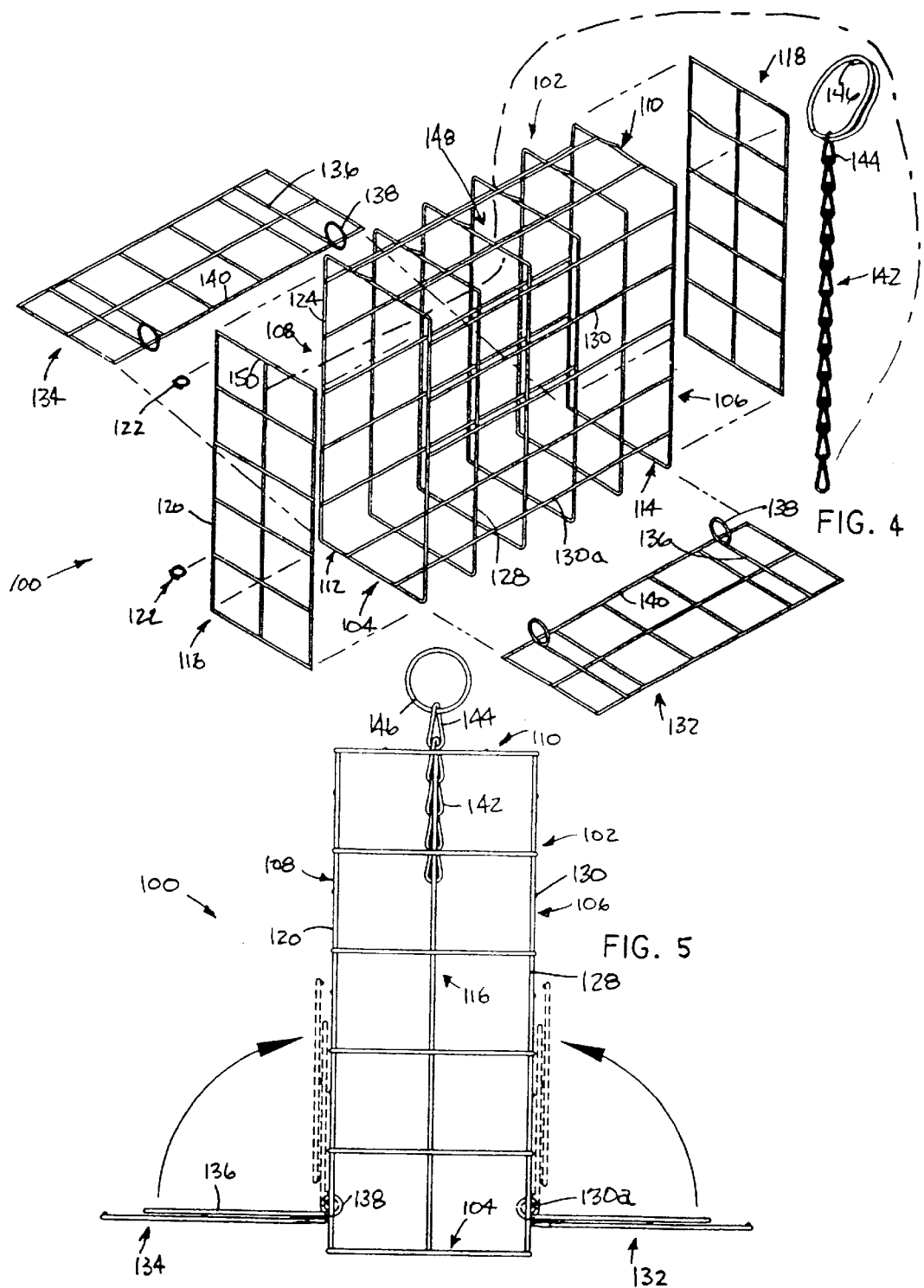

BIRD FEEDER

CROSS REFERENCE TO RELATED APPLICATIONS

This application claims priority to prior provisional application Ser. No. 60/056,168—filed Aug. 19, 1997 and provisional application Ser. No. 60/066,385—filed Nov. 21, 1997.

FIELD OF THE INVENTION

This invention relates generally to animal feeders and particularly to a bird feeder having a construction making it easier to fill than prior designs while making it difficult for squirrels and other unintended animals to take the seed.
Discussion of the Related Art Although there are many bird feeder designs, they generally fall in to one of two categories: unconsolidated feeders for loose bird seed and liquid feeders, and consolidated feeders for receiving blocks of feed such as suet-seed cake and the like. Traditional suet-seed cake feeders such as those available from Metz Farms under the BIRDOLA brand name, comprised a wire mesh base supporting two opposing clam-shell halves, each hinged to the base. The two clam-shell halves are held together in the closed position about the enclosed suet-seed cake by a pitched roof member, wherein the sloped portions of the roof caused the clam-shell halves together. Other designs are based on the same general principle. See for example U.S. Pat. No. 5,052,342 which shows a cylindrical mesh container mounted in a circular hole in a frame which, in turn, is received by a slot in a base member to keep the frame upright.

The disadvantages with many of the suet-seed cake feeders is that they are difficult to refill. Additionally, the prior designs were often opened by marauding rodents such as squirrels who, in the case of the clam-shell design, found it easy to spread the shell apart for access to the cake. In the case of the cylinder, the tops often became loose after exposure to the elements and were easily pried off by the squirrels, providing free access to the enclosed suet-cake. A further disadvantage with many of the prior suet-seed cake feeders lies in packaging. Many prior art existing designs have rigid constrictions which dictate certain minimum box requirements. Shipping and packing costs per item are thus fixed to some extent because of he product shape. Some have been able to reduce packing costs by selling the feeders disassembled. However, it has been shown that purchasers prefer less assembly rather than more. The instant invention embodied by the bird feeder provide substantial solutions to the foregoing problems.

SUMMARY OF THE INVENTION

A bird feeder is provided for solid bird seed cakes which provide easier access and placement of the cakes in the feeder than previous designs. The feeder embodying the invention employs a design which makes it more difficult, if not impossible, for squirrels and other unintended animals, access to the seed.

According to one form of the bird feeder embodying the invention, a cage is provided and configured to receive the bird seed cake therein. The cage includes a base, at least two walls interconnected to each other along an edge and interconnected along a lower edge to the base. A door is also provided, being hingedly coupled to an edge of one of the walls such that the door may pivot between an opened and closed position. At the upper edge of the door and walls is a top wall which closes the cage. A flexible member is provided which extends through an opening provided in the top wall and is connected to the door. The opposite end of the flexible member is configured for attachment to a support structure for suspending the bird feeder. The weight of the bird feeder and enclosed bird seed, plus the weight of any raiding animal, applies tension to the flexible member which keeps the door closed. In another form of the invention, a roof member is provided to shield the bird seed cake from rain and snow as well as to provide a barrier to marauding animals. The roof member has a centrally located hole through which the flexible member extends. In yet another form of the invention, the bird feeder is provided with at least one perch for the birds. The perch may be either in the form of a fixed perch defined by a lateral extension of the mesh base, or by folding members hinged to at least one of the side walls.

The advantage provided by this invention is the ability to apply a generally constant tension on the door to keep it closed while it is hanging. The weight of any marauding animal in the feeder simply increases the tension. When the time comes to replenish the feeder, the owner does not need to take the feeder down to fill it as was required by the prior designs. Rather, the owner only need to pull open the door, slide in the new cake, and release the door. The door automatically closes. In the embodiment having a foldable perch, an advantage lies in the ability to package the bird feeder in a much smaller package than with the fixed perch feeder. Because the base is fixed with respect to the side and end walls, the footprint or dimension of one side of the box is also fixed. However, with the foldable perch embodiment, the size of the box can be substantially less, being slightly greater than the width of the base.

BRIEF DESCRIPTION OF THE DRAWING FIGURES

A better understanding of the invention may be achieved by reference to the drawing figures and as further described by the description of the invention provided below, wherein:

FIG. 4 is an exploded perspective view of an alternate embodiment of the bird feeder; and FIG. 5 is an elevation view taken along line V—V shown in FIG. 4.

DETAILED DESCRIPTION OF THE DIFFERENT EMBODIMENTS

A bird feeder for retaining compressed cakes of bird seed and embodying the invention is provided. The bird feeder is constructed to provide easier access and placement of the bird seed cake in the feeder than was available in previous designs. The bird feeder embodying the invention described herein also makes it difficult for squirrels and other unintended or marauding animals to reach the seed. In addition to the advantages provided above, an alternate embodiment of the invention conserves packaging space when fully assembled than prior feeders.

Figure 1:
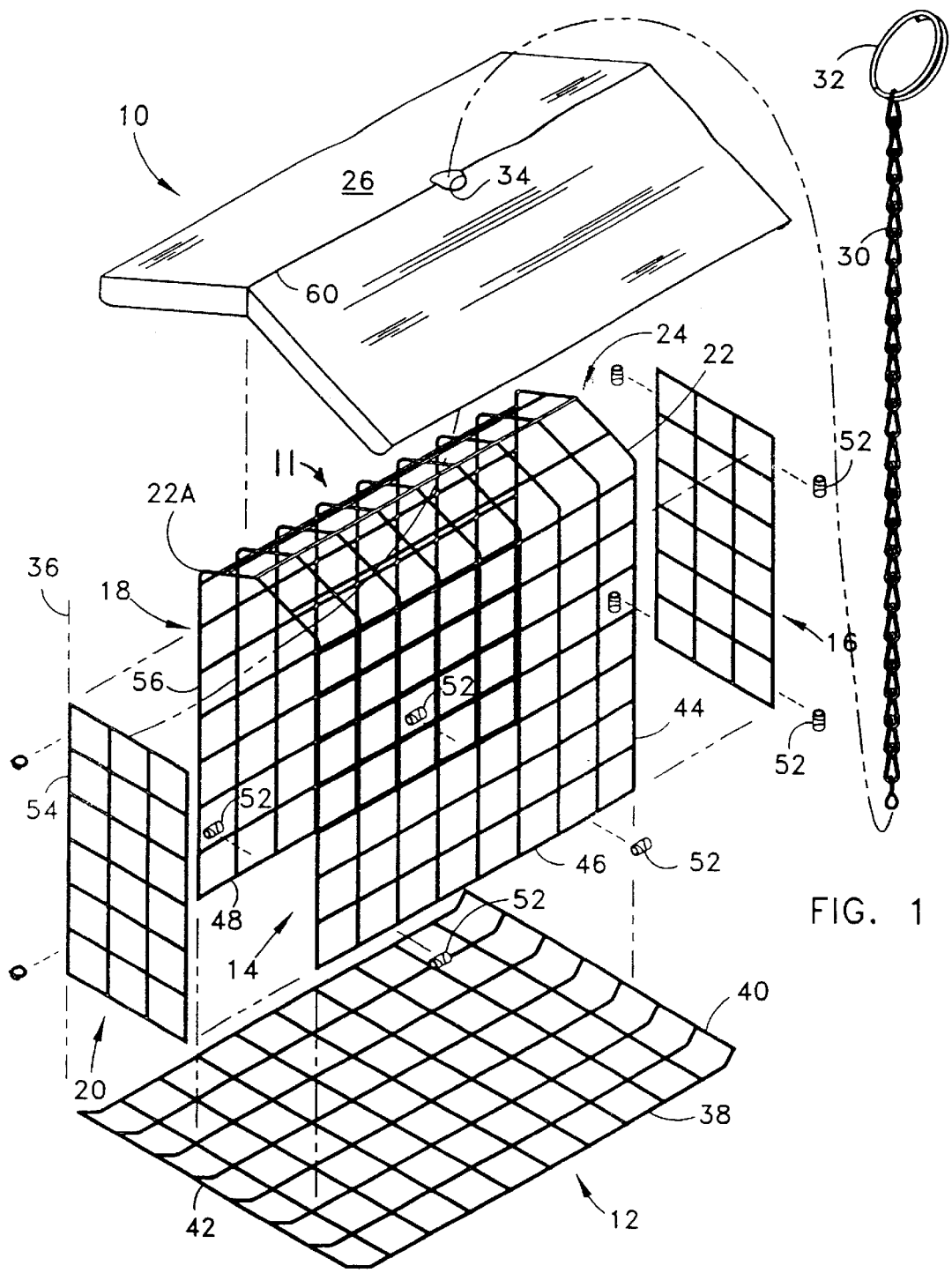
FIG. 1 is an exploded perspective view of a bird feeder embodying the invention.
Figure 2:
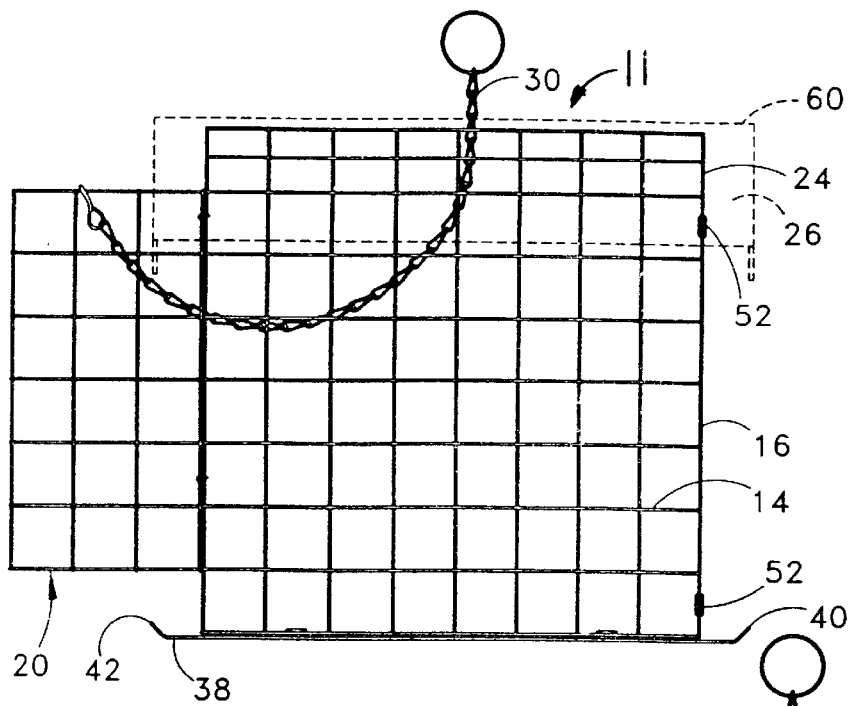
FIGS. 2 and 3 are elevation views of the invention.
Figure 3:
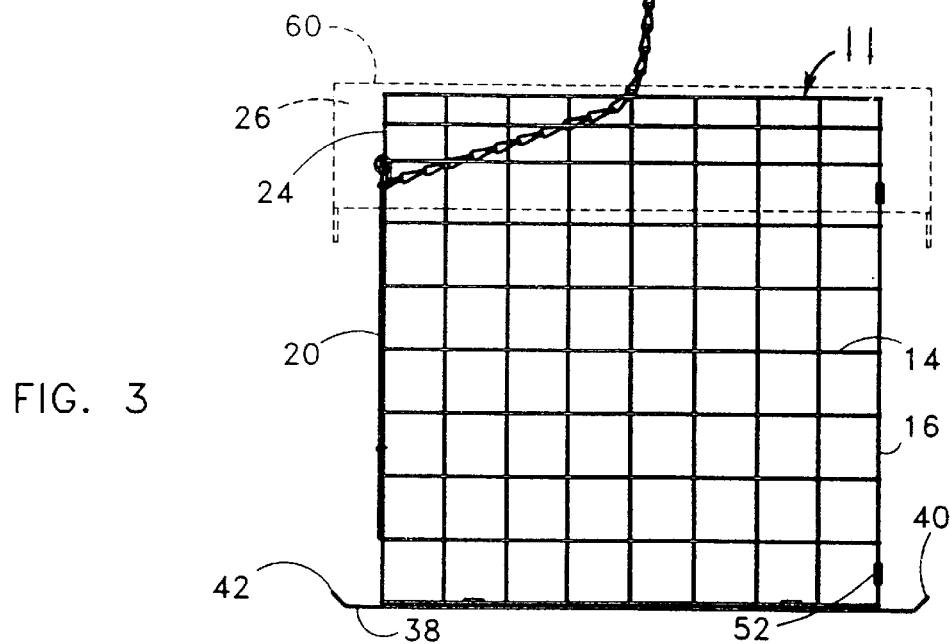

Referring to FIGS. 1–3, the feeder 10 comprises a cage 11 defined by a base 12, and at least two and preferably three upright walls 14, 16 and 18 interconnected to each other and extending upright from base 12. The base 12 may be made from a sheet 38 of plastic coated wire mesh, having a length greater than its width. The base 12 is substantially flat except for the two opposing ends 40, 42 which may be bent upwards. The outer margins of the base which extend beyond the walls are intended to provide at least one perch for the birds to rest. In a preferred embodiment, two of the walls 14 and 18 are side walls located opposite each other and are interconnected along an upper edge 22, 22a by a top wall such as arcuate upper wall 24. In the preferred embodiment, side walls 14, 18, and upper wall 24 are formed from a single sheet of material 44 bent in the middle to form the arcuate wall 24. The lower edges 46 and 48 of wall 14 and 18, respectively, are coupled to base 12 by clamps 52. At one end, the opposing side walls 14 and 18 are interconnected together and closed by end wall 16. At the opposite end, the opposing side walls 14 and 18 are closed by a door 20, preferably hinged about a vertical axis to one of the free ends of the side walls 14 and 18. Wall 16 and door 20 of the bird feeder 10 are also preferably formed from the same materials as the base 12 and walls 14 and 18, but are dimensioned to generally span the distance between one edge of wall 14 and a corresponding edge of wall 18. Wall 16 interconnects walls 14 and 18, and is secured in place by the same type of couplers, bands, or clamps 52. At the opposite end of the bird feeder 10, door 20 is of substantially the same dimension as wall 16 to extend across the gap between the walls 14 and 18, having one vertical edge such as 54 hinged to a vertical edge 56 of wall 18 so that door 20 swings outwardly away from the feeder. The interior of the cage 11 is thus large enough to receive a compressed suet-seed cake such as sold by Metz Farms under the BIRDOLA brand name.

Overlying and on top of the arcuate upper or top wall 24 is a roof member 26 having an expanse at least equal to and preferably greater than base 12. It is contemplated that roof member 26 may be made from any one of a number of different materials and in different shapes, so long as it generally protects the underlying enclosed suet-seed cake from precipitation. In a preferred embodiment, roof member 26 is formed from a sheet of aluminum or other rigid material and bent or pitched about a longitudinal midline 60 to permit run off of the rain and snow. The roof member also preferably includes a centrally disposed opening or passage 34 for reasons which will become apparent below.

The bird feeder is intended to be suspended from a support structure (not shown) such as a hook, branch, beam, or other structure. In the preferred embodiment the bird feeder 10 is preferably suspended from a support structure by a flexible suspension member 30 such as a chain having a hanger 32 at one end. Chain 30 extends through the centrally located opening 34 in the roof 26 and through the gaps in the mesh of the upper wall 24 wherein the end is attached to the upper end of the door 20. Door 20 is hinged and permitted to swing open about a hinge line 36 when there is a release of tension on chain 30. Tension on chain 30 draws door 20 closed.

A substantial number of the bird feeder components are preferably made from a rigid wire mesh. The mesh is preferably made from wire between 8 and 18 gauge, and most preferably about 14 to 16 gauge. Furthermore, it is desired to coat the mesh with a plastic or other polymeric material so that substantially all of the wire surfaces and coupling points are sealed. The polymeric coating reduces corrosion and softens sharp points on corners of the wires.

In operation, the owner removes the bird feeder 10 from any hanger such that chain 30 becomes loose. The owner can then open door 20 to insert a compressed bird seed cake such as those sold under the BIRDOLA brand and available from METZ FARMS of Michigan. The bird seed cake is of a dimension intended to substantially fill the space between walls 14, 16, 18, and door 20. With the cake in place, the owner suspends the feeder from a support whereby the weight of the bird feeder 10 and enclosed cake place chain 30 in tension, drawing door 20 closed. The weight of any animal on the feeder 10 increases the tension of door 20 to prevent it from being opened.

Referring to FIGS. 4 and 5, an alternate embodiment of the feeder 100 is shown which utilizes a similar cage construction as described above. Feeder 100 includes a wire mesh frame or cage 102 having a floor 104 integrally connected to two opposing and vertically extending side walls 106 and 108, both of which transition and are integrally connected to an upper wall 110. Frame 100 is preferably made from a wire mesh which has been bent and otherwise formed to define the frame. In the alternative, the floor 104, side walls 106, 108 and upper wall 110 can be formed from separate sheets of wire mesh interconnected along their edges by welds, clamps or bands.

Attached to the opposing ends 112 and 114 of frame 102 are end panels 116 and 118. End panel 116 is preferably hinged along one edge 120 by ring clips 122 to one edge 124 defined along the end 112. The ring clips 122 permit end panel 116 to swing about the edge 124 so that the end panel 116 may be opened and closed with respect to frame 102. The opposite end 114 is closed by end panel 118. Alternatively, end panel 118 may be attached by clips such as 122. In the preferred embodiment, Once the cage 102 have been completed, the entire mesh frame 102, including the fixed end panel 118, are dipped in the polymeric material mentioned above to provide the resilient coating.

The mesh forming the side walls 106 and 108 include a plurality of stiles 128 extending vertically and interconnected at spaced intervals horizontally to rails 130. Attached to rail 130a located along a lower portion of each of the side walls 106 and 108 is a perch 132 and 134, respectively. Each perch is preferably made from a mesh material similar to that used to form frame 102 and the end panels 116, 118. Attached to the cross members forming each perch 132, 134 are stiles 136 having an extension portion which is bent to produce a clip or ring coupler 138 which extends around the lower rail 130a so that each perch 132, 134 is pivotally coupled thereto. Each ring coupler or clip 138 is located proximate an end rail 140 at the edge of each perch and extends the length thereof and is positioned adjacent the mesh frame 102. Each end rail 140 engages the stiles 128 below each ring coupler 138 to restrict the downward rotational angle of each perch as it pivots about each ring coupler 138 (see FIG. 5). The feeder 100 is preferably suspended by a chain 142 having one end 144 coupled to a hanger 146 and a second end which extends through a central opening 148 in the upper wall 110 and is connected to the upper edge 150 of end panel 116.

In operation, the foldable perch feeder is assembled as shown and described above. The perch 132 and 134 may be folded upwardly to lie substantially against each of the side walls 106 and 108. Likewise, the end panels 116 and 118 are located substantially over the open ends 112 and 114 at opposite ends of the cage 102. The chain 142 is permitted to pass through the central opening 148 such that the hanger 146 at the end 144 may be attached to a support structure for hanging the feeder. As mentioned above, perches 132, 134 are foldable to lie substantially flat and parallel against the exterior wall 20. In this configuration, the foldable perch bird feeder assumes a substantially rectangular configuration and is able to be shipped in a package or container closely approximating the outside dimensions of the feeder 100.

With the feeder 100 removed from the packaging or carton, the operator simply lifts the feeder 100 by the hanger 146 to remove it from the box. The user may then provide sufficient slack in chain 142 to enable the end panel 116 to pivot about the ring clips 122 such that a compressed bird seed cake such as that available under the BIRDOLA brand and sold by Metz Farms may be inserted within the frame 102. With the cake inserted or contained within the frame 102, the operator then simply hangs the feeder 100 by the hanger 146 from the desired location. The weight of the feeder 100, and the compressed bird seed cake places the chain 142 in tension and keeps the end panel 116 tightly closed over the opening 112, thus securing the compressed bird seed cake therein. The opening between the stiles and rails of the mesh may be of any desired dimension, but it is preferred that the openings range from approximately one quarter inch up to about approximately one inch, depending upon the type of bird or animal to be attracted to the feed cake, and the composition of the seed cake. If the cake comprises predominantly larger seed products, such as sunflower seeds and the like, it may be desired to provide larger openings in the mesh than smaller ones.

I claim:

1. A bird feeder for retaining a compressed cake of bird seed, comprising:
    a cage configured to receive the compressed cake of bird seed therein, said cage having a base, at least two walls interconnected to each other along an adjoining edge and interconnected to said base along a lower edge of each wall, and a door hingedly coupled to a vertical edge of one of said walls such that said door may pivot between an opened and closed position with respect to said at least two walls;
    a top wall at an upper edge of said at least two walls and said door and having a centrally disposed opening extending therethrough; and
    a flexible member having a first end extending through said opening in said top wall and connected to said door, and a second free end configured to hang the bird feeder from a structure, wherein said door is urged to a closed position when the bird feeder is suspended from said flexible member.

2. The bird feeder as defined in claim 1, further comprising a roof member disposed on top of said top wall and having a central opening for receiving said flexible member therethrough.

3. The bird feeder as defined in claim 2, wherein said roof member includes a sheet of material which substantially overhangs said cage.

4. The bird feeder as defined in claim 1, further comprising at least one perch extending from at least one of said at least two walls.

5. The bird feeder as defined in claim 4, wherein said at least one perch is hingedly coupled to said one of said at least two walls and is configured to pivot downwardly from a first position generally parallel to said one of said at least two walls to a second position generally perpendicular to said one of said at least two walls.

6. The bird feeder as defined in claim 1, further comprising a perch defined by said base and extending outwardly beyond said at least two walls.

7. The bird feeder as defined in claim 1, wherein said top wall includes a wall interconnecting said at least two walls.

8. The bird feeder as defined in claim 1, further including a third wall interconnected to said at least two walls and said door for defining a generally rectangular structure.

9. The bird feeder as defined in claim 1, wherein said at least two walls, said base, and said top wall are formed from a single piece of mesh.

10. The bird feeder as defined in claim 1, wherein said base, said at least two walls, and said top wall comprise a mesh.

11. The bird feeder as defined in claim 1, wherein said flexible member includes at least one of a chain, a wire, a cord, and a string.

12. A seed-cake bird feeder for suspension from a supporting structure, comprising in combination:
    a cage having a bottom wall, a plurality of side walls, and a top wall configured generally in the same shape of the seed-cake, at least one of said plurality of side walls including a hinged door for inserting the seed-cake into said cage;
    at least one perch extending from said cage; and
    a flexible member having a first end extending through said top wall of said cage, and connected to said hinged door, and an opposite free end configured for attachment from the supporting structure, wherein the weight of the seed-cake bird feeder, when suspended on said flexible member, urges said hinged door to a closed position.

13. The seed-cake bird feeder as defined in claim 12, wherein said at least one perch includes a perch hingedly connected to at least one of said plurality of side walls and configured to move between a first position generally parallel with said at least one of said plurality of side walls to a second position generally extended relative to said at least one of said plurality of side walls.

14. The seed-cake bird feeder as defined in claim 13, wherein said cage includes a cage formed from wire.

15. The seed-cake bird feeder as defined in claim 13, wherein said bottom wall, at least two of said plurality of side walls and said top wall are formed from a single sheet of mesh.

16. The seed-cake bird feeder as defined in claim 13, wherein said bottom wall, at least two of said plurality of side walls, said top wall, and said at least one perch are interconnected by coupling members.

17. The seed-cake bird feeder as defined in claim 12, wherein said at least one perch includes a perch defined by an extension of said bottom wall beyond said plurality of side walls.

18. A squirrel resistant bird feeder configured to be suspended from a support structure, comprising in combination:
    a cage having a base, at least two opposing side walls, at least one end wall, and a top wall interconnected to each other, and a door opposing said at least one end wall and hinged to one of said opposing side walls;
    a perch extending from said cage defined by at least one of said base and a hinged panel attached to one of said at least two opposing side walls; and
    a suspension member having a first end extending through said top wall of said cage and connected to said door such that when said cage is suspended from said support structure by said suspension member, tension is applied to said suspension member sufficient to keep said door in a closed position.

19. The squirrel resistant bird feeder as defined in claim 18, wherein said at least two opposing side walls, said at least one end wall, said top wall, and said door define an interior to said cage having dimensions sufficient to receive a bird-seed cake therein through an opening covered by said door.

20. A bird feeder for use with suet-seed cakes, comprising in combination:

a cage having a base, a plurality of walls interconnected to each other and to said base, said base and said plurality of walls defining an interior volume configured to receive at least one suet-seed cake therein and accessible through at least one opening;

at least one door covering said at least one opening;

a hanging member having a free end, said hanging member attached at an opposite end to said at least one door for keeping said at least one door closed when said bird feeder is suspended from a support structure by said housing member; and at least one perch member hingedly coupled to an exterior of at least one of said plurality of walls such that said at least one perch member is foldable between a first position generally parallel with said at least one of said plurality of walls, and a second position generally perpendicular to said at least one of said plurality of walls.

21. The bird feeder as defined in claim 20, wherein said at least one perch is hinged about an axis generally parallel with said base of said cage.

22. The bird feeder as defined in claim 21, wherein said base and said plurality of walls of said cage include a single sheet of mesh.

23. The bird feeder as defined in claim 22, wherein said single sheet of mesh includes a polymeric coating.

* * * * *